United States Patent [19]

Roscoe et al.

[11] Patent Number: 5,369,578
[45] Date of Patent: Nov. 29, 1994

[54] METHOD AND APPARATUS FOR USING NON-LINEAR SPECTRAL FITTING PROCEDURES ON GAMMA-RAY SPECTRAL DATA

[75] Inventors: Bradley A. Roscoe, Pasadena; Christian Stoller, Kingwood, both of Tex.

[73] Assignee: Schlumberger Technology Corporation, Houston, Tex.

[21] Appl. No.: 64,622

[22] Filed: May 20, 1993

Related U.S. Application Data

[63] Continuation of Ser. No. 564,251, Aug. 7, 1990, abandoned.

[51] Int. Cl.$^5$ ............................................ G06F 15/21
[52] U.S. Cl. .................................................... 364/422
[58] Field of Search ................... 364/422, 498, 571.03, 364/571.04; 250/256, 260, 262, 270

[56] References Cited

U.S. PATENT DOCUMENTS

| | | |
|---|---|---|
| 3,521,064 | 7/1970 | Moran et al. . |
| 3,928,763 | 12/1975 | Scott . |
| 3,930,153 | 12/1975 | Scott . |
| 3,930,154 | 12/1975 | Scott . |
| 4,071,755 | 1/1978 | Supernaw et al. . |
| 4,317,993 | 3/1982 | Hertzog et al. . |
| 4,340,934 | 7/1982 | Segesman ............................ 364/422 |
| 4,390,783 | 6/1983 | Grau . |
| 4,394,574 | 7/1983 | Grau et al. . |
| 4,464,569 | 8/1984 | Flaum . |
| 4,507,554 | 3/1985 | Hertzog . |
| 4,587,424 | 5/1986 | Grau . |
| 4,661,701 | 4/1987 | Grau . |
| 5,081,351 | 1/1992 | Roscoe et al. ...................... 250/270 |
| 5,086,224 | 2/1992 | Roscoe et al. ...................... 364/422 |
| 5,120,955 | 6/1992 | Galford ............................... 250/256 |
| 5,121,337 | 6/1992 | Brown ................................. 364/498 |

OTHER PUBLICATIONS

The Book "Data Reduction and Error Analysis for the Physical Sciences" by P. Bevington, Ed. McGraw-Hill Book Co., 1969 pp.204-246.
The Book "Solving Least Squares Problems" by C. L. Lawson & R. J. Hanson, Prentice-Hall Inc., 1974, pp. 180-194.
The Book "Numerical Recipes" by W. H. Press et al., Editor Cambridge University Press, 1986, pp. 523-528.

*Primary Examiner*—Robert A. Weinhardt
*Attorney, Agent, or Firm*—Henry N. Garrana; Darcell Walker

[57] ABSTRACT

A method and an apparatus for decomposing a gamma spectrum representative of an unknown material for determining the contribution of each constituent postulated to constitute the material, wherein an energy spectrum of the gamma rays issued from the material is formed, as well as a composite spectrum made up of individual standard spectra of the postulated constituents and comprising elemental yields being representative of the proportion of the corresponding constituents; the best fit between the measured spectrum and the composite spectrum is determined by modifying simultaneously at least one elemental yield and at least one parameter representative of the conditions under which the measured spectrum and the composite spectrum have been obtained. The best fit may be based on any non linear least squares search for a global minimum of $X^2 = (S\ Y-U)^T W(S\ Y-U)$, where "U" is a matrix representing the measured spectrum, "S" is a matrix representing the composite spectrum, "Y" is a matrix representative of the elemental yields and "W" is a weight matrix. The non linear fitting method used may be e.g. a gradient search or the Marquardt method.

41 Claims, 3 Drawing Sheets

METHOD AND APPARATUS FOR USING NON-LINEAR SPECTRAL FITTING PROCEDURES ON GAMMA-RAY SPECTRAL DATA

This is a continuation of application Ser. No. 07/564,251 filed Aug. 7, 1990 now abandoned.

BACKGROUND OF THE INVENTION

1. Field of the Invention

This invention relates to nuclear measurements involving the spectroscopic analysis of energy spectra of gamma rays representative of atoms of elements under investigation, in order to determine the respective gamma ray contribution in percentage of different elements to a measured spectrum representative of an unknown material. From the percentage contributions (also called "elemental yields") may be derived concentration of these elements in the unknown material. By way of non limiting example, the invention can find application in nuclear well logging techniques, wherein a sonde is lowered in a well (or borehole) and carries out spectral measurements from which are derived information about the composition of the earth formation surrounding the borehole, or the borehole fluid, or the annulus including casing and cement located between the borehole wall and the formation. Alternately, examples of application for the present invention are material analysis using x-rays or gamma rays, medical analysis (by scanning) or airport security detection.

2. Related Art

A major goal of well logging is to obtain quantitative and qualitative information related to hydrocarbons in earth formation surrounding a well. In nuclear well logging, one carries out a spectral analysis of energy spectra of gamma rays resulting either from natural radioactivity or atom interactions of atoms with neutrons emitted from the sonde, such gamma rays being representative of certain atoms of the lithology or of the borehole fluid. Any reference hereafter made to "formation" or "lithology" has to be construed as referring to formation and/or borehole fluid. The invention cam also be applied to the nuclear tracer logging techniques.

For example, the energy spectrum of gamma rays resulting from the capture of thermal neutrons, after being decomposed into contributions due to individual atomic elements, usually called "elemental yields", reveals information concerning the presence of earth formation elements such as e.g. hydrogen, silicon, calcium, chlorine, sulfur and iron. Important petrophysical parameters such as porosity, matrix lithology and water salinity may be derived from the elemental yields. Examples of capture gamma ray spectra analysis are depicted in U.S. Pat. Nos. 3,521,064 to Moran et el., 4,464,569 to Flaum, 4,507,554 to Hertzog & Nelligan, 4,661,701 to Grau, 4,810,876 to Wraight et el.; 4,937,446 to Roscoe, Stoller and McKeon shows an inelastic gamma ray spectral analysis. All the above mentioned patents are assigned to the assignee of the present application, and are as well incorporated herein by reference. In the same vein, spectral analysis of natural gamma rays provides information on the uranium, thorium and potassium content of the earth formation, as shown e.g. in U.S. Pat. No. 3,976,878 to P. Chevalier & B. Seeman. As a further example, U.S. Pat. No. 4,166,216 to W. E. Cubberly shows a tracer logging method.

In accordance with the teaching of the above identified Moran Patent, a measured gamma ray energy spectrum, representative of a formation of unknown composition, is compared with a composite spectrum constructed from individual laboratory derived standard spectra of the constituents postulated to comprise the formation. The different amounts of the standard spectra (elemental yields) which give the best fit to the measured spectrum when weighted by each element sensitivity (i.e. the ability of an element to emit gamma rays) represent the relative proportion of the constituents of the formation. By appropriate selection of the standards, the proportion of the constituents of interest can be obtained and the desired information regarding hydrocarbon content may be derived.

The search for the best fit between the respective measured and composite spectra is, according to the method known so far, based on a linear least squares method, realizing a grid search for the minimum, such as depicted in the Moran Patent and in U.S. Pat. Nos. 3,928,763; 3,930,153 and 3,930,154 to H. D. Scott. Briefly stated, the least squares fitting method requires that the following function be minimum:

$$\int \left[ \sum_{k=1}^{n} Y_k f_k(E) - g(E) \right]^2 dE \quad (1)$$

where "$f_k(E)$" are the standard spectra; "$Y_k$" are the corresponding elemental yields indicative of the proportion of that constituent "k" in the formation; "$g(E)$" is the function describing the measured spectrum, and "n" is the number of constituents, i.e. the number of standard spectra. Equation 1 could also be expressed in the matrix form:

$$U^i + E^i = \sum_{k=1}^{n} S_k^i Y_k \quad \text{for } i = 1, \ldots, m \quad (2)$$

where "U" represents the measured spectrum; "$E^i$" is the difference between the composite spectrum and the measured spectrum, i.e. the error in the measured spectrum; "$S_k^i$" represents the standards, "$Y_k$" are the unknowns i.e. the elemental yields, and "m" is the number of elemental energy intervals (or channels) of the spectrum. Minimizing the error in the fit means minimizing the chi-square "$X^2$", in matrix notation:

$$X^2 = (S\ Y - U)^T (S\ Y - U) = E^T E \quad (3)$$

The known linear least squares fitting method, although having been satisfactorily used up to now, shows some limitations, as explained hereafter.

The fit supposes that the respective measured and standard spectra have been obtained under equal or similar conditions. The parameters representative of these conditions are e.g. the gain, the offset, the background subtraction factor (hereafter referred to as BSF) and the resolution degradation factor (hereafter referred to as RDF). RDF is a parameter representative of the effects, on the detector measurements, of the variation from one detector to the other, or of the count rates effects due to the processing electronics downstream from the detector, or finally of the temperature which is of importance in the oil well logging application since the differences in temperature between the laboratory, where the standard spectra are obtained, and the Borehole environment, where the measured spectra are acquired, can be extreme.

These parameters are generally different from the measured spectrum to the composite spectrum. Thus, the measured spectrum must be corrected to match the hereabove mentioned parameters such as gain, offset, BSF of the composite spectrum, and the composite spectrum has to be corrected for RDF to match the resolution of the measured spectrum. This is done, in a known manner, by iteration through successive least squares fits of the measured spectrum to the composite spectrum while modifying one parameter at a time, the other parameters remaining constant. For example, the gain is modified during a first iterative process, the other parameters Being assigned a given value, until a fit is obtained. Then, a second iterative process is carried out until a fit is reached, by modifying the offset only, while the gain is assigned the optimum fitting value which has been determined during the first iteration, the other parameters remaining constant. This is followed by a process for causing the composite spectrum to be degraded in a manner which takes into account the effects of temperature on the detector resolution during the detection of the measured spectra, such as described in U.S. Pat. No. 4,394,579 to Grau and Hertzog and assigned to the assignee of the present application. A further iterative process is generally carried out for the background.

The known linear least squares fitting method as hereabove described involves the modification of one parameter at a time, i.e. the gain, then the offset, the RDF and finally the BSF, and is usually called a grid search.

This known method is not fully satisfactory since each parameter is actually correlated with the others. Thus, the value of one parameter which provides the best fit might not be the optimum value when the remaining parameters are given their own fitting values. In mathematical terms, this means that the fitting value of one (or several) of the parameters might have reached a local minimum instead of a global minimum, and thus might not represent the best fit. At best, even in assuming the global minimum has been reached, the method may converge very slowly towards the global minimum. One attempt to overcome this drawback has been to repeat and refine several times the above captioned iterative calculations, for each parameter. Nevertheless, this increases the complexity and the duration of the calculation without providing substantial benefit with regard to the uncertainty on the determination of the best fit.

Consequently, the need remains for a method providing a reliable fit between the measured spectrum and the composite spectrum, and thus improving the determination of the elemental yields.

Furthermore, the trend in the logging industry has always been to reduce the calculation time which allows one to make more measurements per time unit and/or use computer of reduced size.

OBJECTS OF THE INVENTION

A principal object of this invention is to provide a reliable and efficient method for determining elemental yields from a measured gamma ray spectrum, by determining the best fit between the measured spectrum and a composite spectrum made up of standard spectra.

SUMMARY OF THE INVENTION

According to the invention, these and further objects are attained by a method for decomposing a gamma ray spectrum representative of an unknown material in order to determine the respective gamma ray contribution of each constituent postulated to constitute the material, comprising:

detecting and counting the gamma rays issued from the material;

forming an energy spectrum of the measured gamma rays;

establishing a composite spectrum made up of individual standard spectra of the postulated constituents and comprising elemental yields being representative of the proportion of the corresponding constituent; and determining the best fit between the measured spectrum and the composite spectrum by modifying simultaneously at least two parameters representative of the conditions under which the measured spectrum and the composite spectrum have been established.

Alternately, the best fit determining step includes modifying simultaneously at least one elemental yield and at least one parameter.

The best fit is advantageously based on a non linear weighted least squares search for a global minimum of $X^2 = (S\ Y - U)^T W(S\ Y - U)$, where "U" is a matrix representing the measured spectrum, "S" is a matrix representing the standard spectra, "Y" is a matrix representative of the elemental yields, and "W" is a weight matrix.

More particularly, the search is a gradient search.

Alternately, the search is based on the Marquardt method.

The method may further comprise the steps of irradiating the material with neutrons and detecting the gamma rays resulting from the interaction of the neutrons with the atoms of the material.

According to a specific embodiment, the invention relates to a logging method wherein the unknown material is comprised of either earth formation surrounding a borehole or fluid in the borehole.

The invention also contemplates a method for matching a measured spectrum derived from the detection of nuclear particles representative of unknown earth formations surrounding a borehole, to a reference spectrum, wherein both measured and reference spectra are expressed in a numerical form, i.e. which cannot be expressed by a mathematical formula, including determining the best fit between the measured and reference spectra by means of a non linear fitting technique.

According to another aspect of the invention, the method further comprises minimizing the chi-square function defined as:

$$\chi^2 = \sum_{i=1}^{m} (E^i)^2 / V^i$$

where "$V^i$" is the variance of the content of each individual energy interval or channel in the measured spectrum, with $V^i = 1/W^i$; where $W^i$ is the weight of the measured spectrum; "m" is the number of channels; and "$E^i$" is the error in the fit, with:

$$E^i = \sum_{k=1}^{n} (S_k{}^i Y_k - U^i) \quad \text{for } i = 1, \ldots, m$$

where "n" is the number of constituents, i.e. the number of individual standard spectra composing the composite spectrum (S Y). The minimizing step comprises multiplying the derivative of $X^2$ with respect to a parameter and related to the background by a factor "K" representative of the fact the background spectrum presents a statistical nature.

The characteristics and advantages of the invention will appear better from the description to follow, given by way of a nonlimiting example, with reference to the appended drawings in which:

DETAILED DESCRIPTION

The invention, although being applicable to numerous kinds of spectroscopy measurements, will be hereafter described in connection with the logging industry and, more particularly with a nuclear logging technique involving irradiating the earth formation surrounding a well with neutrons and detecting the gamma rays resulting from the capture of neutrons by the atoms of elements in the formation, such as shown in U.S. Pat. No. 4,484,569 already referred to.

Figure 1:
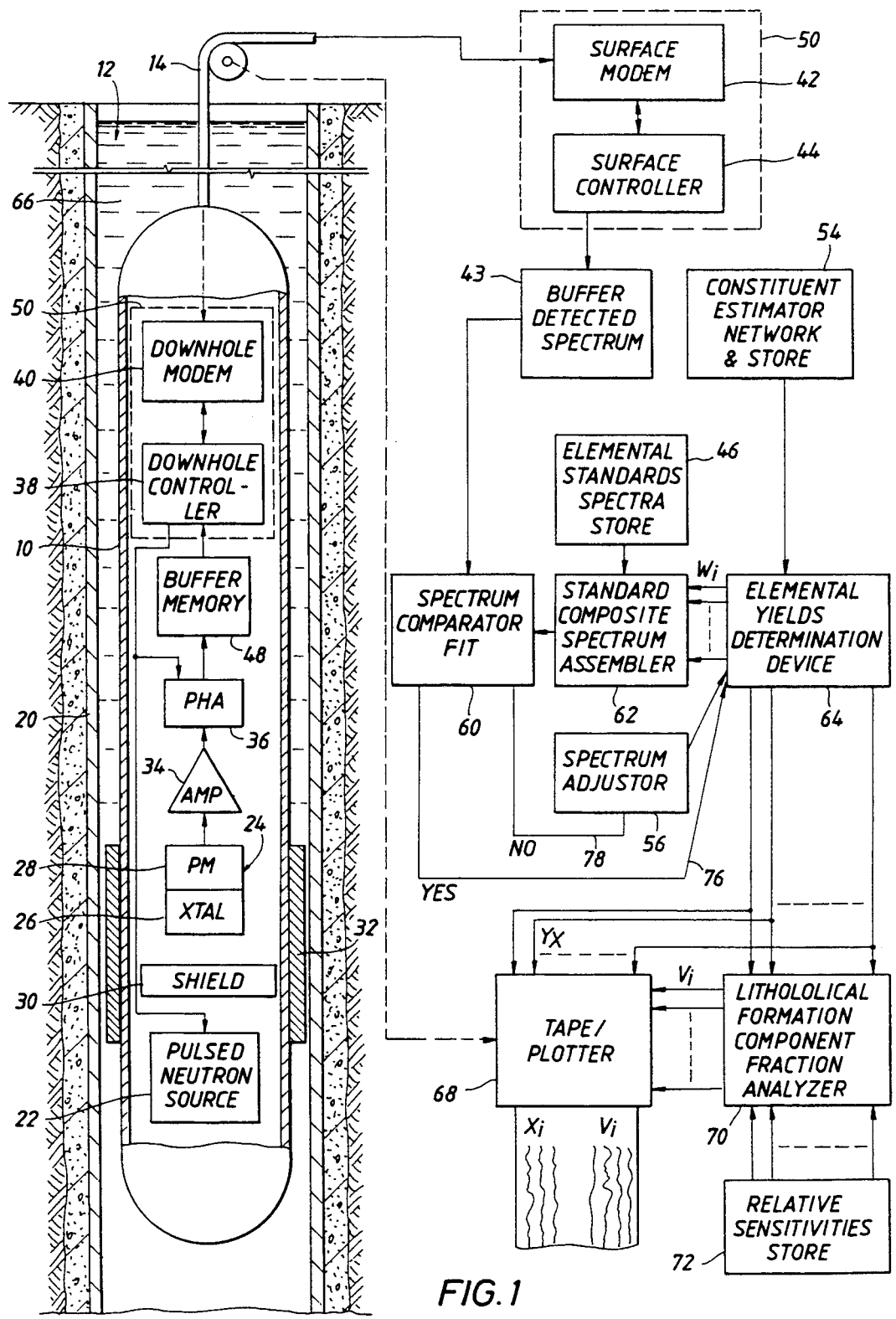
FIG. 1 is a schematic view of an embodiment of a logging apparatus that may be utilized in the practice of the invention.
Figure 2A:
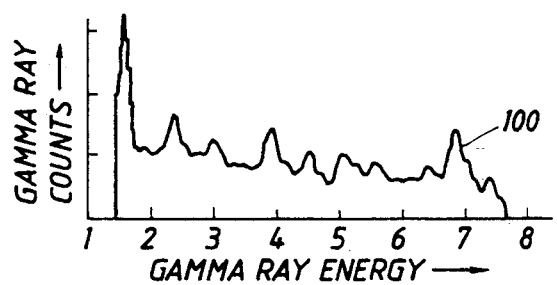
FIG. 2a–f is a graphical representation of a typical composite gamma ray spectrum along with individual gamma ray spectra for constituents of the composite spectrum.
Figure 2B:
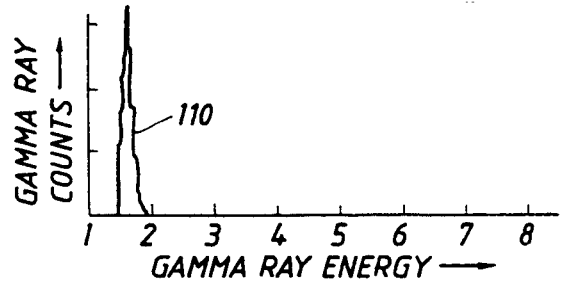
Figure 2C:
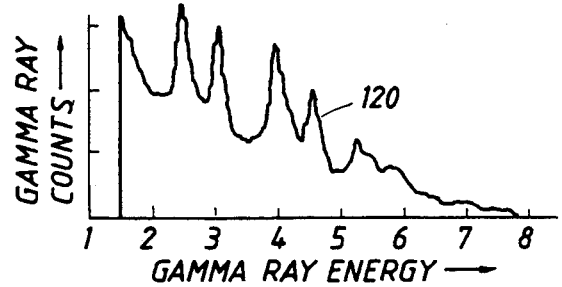
Figure 2D:
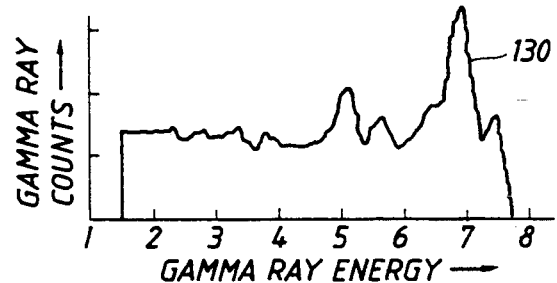
Figure 2E:
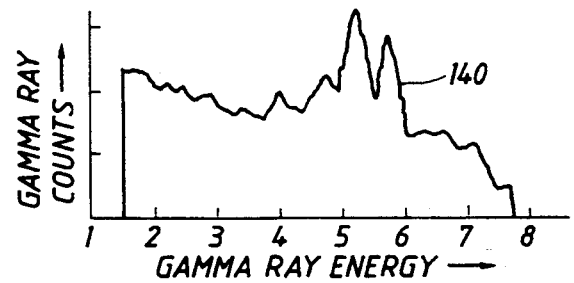
Figure 2F:
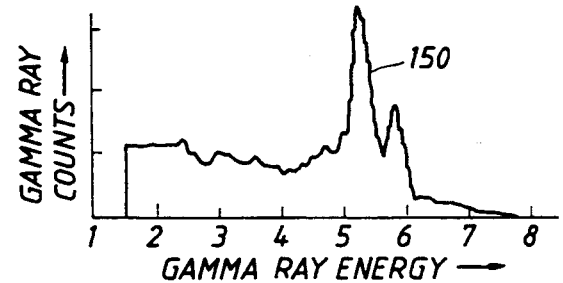

Referring now to FIG. 1, a representative embodiment of the invention includes a fluid tight pressure and temperature resistant sonde 10 that is adapted to be suspended in a well bore 12 by an armored cable 14 for investigating a subsurface earth formation 18. The well bore 12 is illustrated as cased, including the usual annulus of cement 18 and steel casing 20, and as containing a well fluid 66. It will be understood that the invention as described, but with appropriate adjustments, also has application to openhole logging.

The sonde 10 includes a pulsed neutron source 22 for producing high energy neutrons (also called fast neutrons) for the irradiation of the formation, and at least one radiation detector 24 for the detection of secondary gamma ray radiation returning from the formations. The neutron source 22 preferably is of the accelerator type described in U.S. Pat. Nos. 3,461,291 to C. Goodman or 3,546,512 to A. H. Frentrop, both of which are commonly owned with this application and which are incorporated herein by reference. This type of neutron source is particularly adapted to generate discrete bursts of high energy or fast neutrons, e.g., at 14 MeV, of controlled duration and repetition rate.

The detector 24 may be of any construction appropriate to the detection of gamma rays and to the production of a pulse signal in response to each measured gamma ray having an amplitude representative of the energy of the measured gamma ray. Generally, such a detector includes a scintillation crystal 26 which is optically coupled to a photo-multiplier tube 28. The crystal may be either of the thallium-activated sodium iodide, the thallium- or sodium-activated cesium iodide, or the BGO type, or also the GSO type. Alternatively, a solid state detector, having for example a germanium crystal, might be employed. A neutron shield 30 may be positioned between the source 22 and the detector 24 to reduce bombardment of the detector by neutrons emanating directly from the source.

Electrical power for the sonde 10 is supplied through the cable 14 from a power source (not shown) at the surface. Suitable power sources (also not shown) are also included in the sonde 10 for the purpose of driving the neutron source 22, the detector 24 and other downhole electronics. The sonde 10 may be surrounded by a boron carbide impregnated sleeve 32 located generally in the region of the source 22 and detector 24. The sleeve 32 acts as a shield to minimize the detection of gamma radiation originating from the neutron interactions in the tool, i.e. in the immediate vicinity of the source and the detector. An amplifier 34 acts on the output pulses from the photo-multiplier 28. The amplified photo-multiplier pulses are thereafter applied to a pulse height analyzer 38 (hereafter referred to as PHA), which may be of any suitable type. It will be understood to include the usual pulse height discriminators, for selecting the gamma ray energy range to be analyzed, and linear gating circuits, for controlling the time portion of the detector signal train to be analyzed.

PHA 36 segregates the detector pulses into predetermined energy channels according to their amplitude to provide an energy spectrum and supplies signals in suitable digital form representing the amplitude of each analyzed pulse. The digital outputs of PHA 36 are stored in a buffer memory 48 from which they are periodically read out, on demand, by a communications system consisting generally of a downhole communications cartridge 30, the logging cable 14 and a companion surface communications system 50. The combined communications system is a duplex digital system capable of transmitting data at the surface from sonde 10 simultaneously with the transmission of control commands downhole to sonde 10 from a surface control system (not shown). One such communications system is fully described in U.S. Pat. No. 4,355,310 to A. Belaigues, et al, assigned to the assignee of the present application and herein incorporated by reference. Briefly, the downhole controller 38 organizes the transmission of data in both directions, causing the incoming control signals to be delivered to the proper functional elements and requesting and dispatching outgoing sonde-derived data via downhole modem 40 in a multiplexed mode.

At the surface, the signals are received by the surface communications system 50 consisting of a surface modem 42 which receives the data and transfers it to the surface controller 44 which transmits the data to a surface buffer memory 43 as well as to other functional elements (not shown) as needed.

The operation of the monde 10 is controlled by control signals originated in the surface communication system 50. These control signals are dispatched downhole by surface controller 44 and surface modem 42. The control signals are used to orchestrate the operation of the various elements of the sonde 10 such as the neutron source 22 and the PHA 36. In response to the control signals, a pulsing circuit, not shown, generates a plurality of sharp pulses, thereby causing the source 22 to emit corresponding sharp bursts of fast neutrons. For purposes of constituent analysis of capture gamma ray spectra, according to the example of implementation of the invention presently described, the neutron bursts are preferably of an optimal duration and are repeated at short intervals that may be adjusted in accordance with variations in the formation thermal decay time to provide satisfactory statistics in the spectrum analysis procedure. U.S. Pat. No. 4,066,763 to S. Antkiw incorporated herein by reference, discusses such a technique in detail. Other control signals transmitted to the PHA 36 enable the PHA to operate during a number of detection time periods for each neutron burst.

Since it is desirable, in capture spectral analysis techniques, to obtain as pure a capture gamma ray spectrum as possible, the presence of inelastic gamma ray background is avoided by pulsing the neutron source and by gating the detection of gamma rays so that the detection gate is not coincident with the neutron burst. Additionally, the spectroscopy tool is periodically operated so as to accumulate a background spectrum during a period of time following the decay of most of the thermal neutrons. This background spectrum, which contains primarily contributions from formation and tool material activation (such as the scintillatot crystal activation) is subsequently subtracted from appropriately adjusted capture spectra so as to remove this interfering background component.

Signals representing the measured capture gamma ray spectra (representative of the formation under investigation) are assembled and stored in appropriate circuitry such as surface buffer memory 43 for subsequent utilization, which may take place in suitable analog circuitry or in a suitable programmed digital computer such as the PDP-11/34 computer manufactured by the Digital Equipment Corporation, Maynard, Mass.

Before describing in greater detail the particular steps performed in the preferred embodiment of the invention, it is instructive to generally discuss the underlying theory upon which the spectral fitting analysis is based.

The measured spectrum obtained with the PHA 36, is recorded as a histogram. The abscissa is the energy axis which is divided into "m" energy intervals or channels; for typical NaI(Tl)-detector resolution, m=256. The m energy channels may be of equal width. The ordinate for the $i^{th}$ energy channel is the number (or counts) of gamma-rays accumulated for that energy channel. In the following discussion, the spectra are represented as m-dimensional vectors "U". The components "$U^i$" of each vector "U" are normalized such that the sum of the $U^i$'s is unity over the energy range of interest, which may be narrower than the whole energy range. In general, a formation spectrum as measured can be described as a linear combination of a complete set of "n" individual standard descriptor spectra, $S_k$ (k=1, 2, ... , n). Each of these individual standard spectra may correspond to a postulated element. i.e. an element expected to be present in the formation. Thus, "n" is the number of constituents postulated to constitute the formation under investigation. The vectors for the standard spectra are mathematically represented by column vectors of an "m×n" composite spectra matrix "S", such that $$U = \sum_{k=1}^{n} S_k^i Y_k = S Y \tag{4}$$

where "Y" is a vector whose components are the elemental yields $Y_k$ (to be determined) each of which represents the fractional contribution from the corresponding standard vector, $S_k$, to the measured spectrum U. The most significant spectral-response functions required for the capture spectra are usually for elements, H, Si, Cl, Ca, Na, Fe, Gd, Ti and activation background.

As a matter of general interest, as far as mathematical formulas are concerned, the subscript "k" will denote a variable which ranges between 1 and "n" (number of constituents), and the superscript "i" is a variable varying between 1 and "m" (number of channels).

By way of example, FIG. 2 shows a composite gamma ray spectrum 100 made up of a number of individual standard spectra, the identity and spectral distribution of which are known. Each standard spectrum corresponds to a given constituent. The relative proportions of the standard spectra, however, including knowledge of their presence or complete absence in any given case, is not known and must be determined in order to provide the necessary information as to the composition of the formation material being analyzed. From a knowledge of the individual standard spectra for silicon dioxide, which is present in sand, or for calcium carbonate, which is found in limestone, therefore, the measured gamma ray spectrum for the unknown formation material adjacent to the well bore may be analyzed to determine the presence and proportion of those constituents. Accordingly, FIG. 2 also illustrates neutron capture gamma ray spectra for possible constituents of the particular formation being analyzed, the line 110 representing the hydrogen spectrum, the line 120 being the silicon spectrum, and the line 130 corresponding to the iron spectrum, which, in combination with the spectra for certain other elements (not shown) and that for silicon can be used to indicate the response from limestone or sand formations, and the curve 140 representing the sodium chloride spectrum, measured separately. All of the constituent spectra 110, 120, 130 and 140 in FIG. 2 are illustrative only and have been normalized to corresponding maximum amplitudes. Consequently, it will be understood that their magnitudes in FIG. 1 do not add up to the magnitude of the composite spectrum 100 at every energy value, as will be the case in practice. Moreover, as previously indicated, there are other constituent spectra, such as magnesium, sulfur, calcium and the like, not illustrated in FIG. 2, which must be included in the fit if those constituents are believed to be present. Furthermore, it will also be understood that the constituent spectra 110, 120, 130, and 140 are measured in the same manner as will be carried out in the well bore, so that they include any effects resulting from instrumentation.

The general problem of spectroscopy-logging analysis is to determine the contribution of each element to the measured spectrum represented by the elemental yields. Since the composite spectrum S, in the form of a m×n matrix, is not square because the number of channels "m" is greater than the number of constituents "n", it is not possible in general to invert S in order to solve equation (4) for Y. Also, the measured spectrum U contains statistical errors which can be represented by including an error spectrum, E, in Eq. 4.

$$U = S Y + E \tag{5}$$

By selecting a suitable positive symmetric weighting matrix, W (calculated from the covariance matrix V), the weighted statistical error squared (i.e. $X^2$) is:

$$X^2 = E^T W E = (U - S\ Y)^T W (U - S\ Y) \tag{6}$$

where $E^T$ is the transpose of E, and $E^T W E$ is representative of the overall weighted error. The weighted-least-squares solution, which minimizes the error in Eq. 6 is given by:

$$Y = (S^T W S)^{-1} S^T W\ U \tag{7}$$

The choice of the weighting matrix W determines the nature of the least-squares estimate.

Eq. 7 can be rewritten in the form $$Y = L\ U \tag{8}$$

where
$$L = (S^T W S)^{-1} S^T W \tag{9}$$

The matrix "L" consists of "n" row vectors, "$L_k$" each associated with one of the individual standard $S_k$. The vectors $L_k$ are called linear estimators because the scalar product between the measured spectrum and each of the vectors $L_k$, gives the fractional contribution or yield $Y_k$, of the $k^{th}$ element to the measured spectrum.

To generate the set of standard spectra $S_k$, for use in the composite matrix S, standard capture spectra are taken in special laboratory formations designed to emphasize the spectral contribution of each postulated constituent.

As discussed above, each individual standard spectra leads to the generation of an associated linear estimator $L_k$ whose shape reflects the character of the standard and the cross correlations between it and other standards. Thus, the estimator is a type of digital filter that extracts from the measured spectrum U the contribution from its associated composite spectrum. The estimators include both positive and negative components. The positive and negative components occur where a standard correlates with one or more other standards.

To determine the composition of earth formation 16 surrounding the well 12, the magnitude of the measured spectra is compared at a large number of energy channels with a composite spectrum made up of all the individual standard spectra, normalized relative to one another by yield, or amplitude, representing the relative proportions of the corresponding constituents. The mathematical statement of the criterion used to establish the best "fit" permits the determination of the elemental yields to be applied to the composite spectrum supposed to match the measured spectrum. The elemental concentrations or the constituents may further be derived from these elemental yields in a known manner, such as described in U.S. Pat. No. 4,390,783 to Grau incorporated herein by reference.

In order to determine the best fit between the composite spectra and the measured spectra, it is necessary to match the parameters representative of the conditions under which the respective measured and composite spectra have been obtained. A first parameter is the RDF which, as already stated, affects substantially the response of the detector. A second and a third parameter are the gain and the offset which are characteristic of the electronic components used to obtain both measured and composite spectra. A fourth parameter is the BSF. This list of parameters is not exhaustive and e.g. a further parameter may be a parameter representative of the non linearity of the gain.

According to the invention, the best fit is determined through minimizing a given function of both measured and composite spectra while modifying simultaneously the elemental yields and the above mentioned parameters. It has to be noted that, alternately, one could modify simultaneously either all the parameters or at least part of the parameters.

By way of example, one minimizes $X^2$, i.e. the weighted sum of the squares of the deviation of the fitting function (composite spectrum) and the measured function (measured spectrum). The minimum condition for $X^2$ can be formulated as:

$$\chi^2 = \sum_i \frac{\left(\sum_k y_k S_k^i(\alpha) + bB^i(\beta) - U^i\right)^2}{V^i} = \min. \tag{10}$$

where "$B^i$" is the background spectrum (acquired e.g. during the measurements in the borehole); "b" is BSF; "$\alpha$" represents the changes in gain, offset and RDF to be applied to composite spectrum so these parameters match those of measured spectrum; "$\beta$" stands for the gain, offset and RDF parameters of the background spectrum with respect to the measured spectrum and "$V^i$" is the variance spectra which can be expressed as: $V^i = 1/W^i$.

The minimum condition of equation 10 is obtained by setting to zero the derivatives of $X^2$ with respect to the different variables (i.e. parameters). The following equations show the derivative of $X^2$ with respect to the elemental yields "$y_k$" and the background "b":

$$\frac{\delta \chi^2}{\delta y} = 0 \tag{11}$$

$$\frac{\delta \chi^2}{\delta b} = 0 \tag{12}$$

In addition, the derivatives of $X^2$ with respect to gain, offset, and RDF are set to zero as well.

As far as the derivative of $X^2$ with respect to $y_k$ is concerned, equation (11) gives:

$$\delta \chi^2 / \delta y_k = 2 \sum_{i=1}^{m} S_k^i\ W^i \left( \sum_{l=1}^{n} y_l S_l^i + b\ B^i - U^i \right) \tag{13}$$

According to another feature of the invention, the derivative of $X^2$ with respect to background "b" differs from the derivative with respect to "$y_k$" by a correcting factor "K", with $K = 1 - c$, which accounts for the fact the background spectrum is statistical and which stems from the derivative of the variance term in the denominator:

$$\frac{\delta \chi^2}{\delta b} = 2 \sum_{i=1}^{m} B^i W^i \left( \sum_k y_k S_k^i + bB^i - U^i \right)(1 - c) \tag{14}$$

where $$c = b \ W^i \left( \sum_k y_k S_k^i + bB^i - U^i \right)$$

Both the composite spectrum S and the background spectrum B are functions of gain, offset and RDF, thus making $S=S(\alpha)$ and $B=B(\beta)$, where "$\alpha$" and "$\beta$" have been already defined. Derivatives of $X^2$ with respect to "$\alpha$" and "$\beta$" are shown herebelow:

$$\frac{\delta \chi^2}{\delta \alpha} = 2 \sum_i \frac{\delta}{\delta \alpha} \left( \sum_{l=1}^n y_l S_l^i \right) W^i \left( \sum_{k=1}^n y_k S_k^i + bB^i - U^i \right) \quad (16)$$

$$\frac{\delta \chi^2}{\delta \beta} = 2 \sum_i b \frac{\delta B}{\delta \beta} W^i (\Sigma_k y_k S_k^i + b B^i - U^i) \left(1 - \frac{c}{2}\right) \quad (17)$$

In order to solve equations (16) and (17), it is convenient to write the minimum condition (Equation 10) in the matrix form:

$$O = S_{mb}^T W S_m Y - U \quad (18)$$

where "$S_{mb}$" and "$S_m$" denote modified composite matrixes including the background spectrum add the derivatives with respect to gain, offset and RDF. In addition, "$S_{mb}$" includes the correcting factors $(1-c)$ and $(1-c/2)$; see equations 14, 15 and 17. The matrixes $S_{mb}$ and $S_m$ are shown herebelow:

$$S_{mb} = \begin{vmatrix} S_c^1 \ldots S_c^n \\ \cdot \\ \cdot \\ \cdot \\ B^1(1-c) \\ \frac{\delta}{\delta \alpha} (\Sigma y_k S_k^1(\alpha)) \\ b \frac{\delta B^1(\beta)}{\delta \beta} \left(1 - \frac{c}{2}\right) \end{vmatrix} \quad (19)$$

$$S_m = \begin{vmatrix} S_c^1 \ldots S_c^n \\ \cdot \\ \cdot \\ \cdot \\ B^1 \\ \frac{\delta}{\delta \alpha} (\Sigma y_k S_k^1(\alpha)) \\ b \frac{\delta b B^1(\beta)}{\delta \beta} \end{vmatrix} \quad (20)$$

It should be noted that the derivatives of $X^2$ with respect to "$\alpha$", and "$\beta$" and "b" are not constant and equations (16) and (17) are not linear. Equation (18) expressing the minimum condition is equivalent to the following equation:

$$Y = [S_{mb}^T W S_m]^{-1} S_{mb}^T W U \quad (21)$$

It has to be noted that the matrix $[S_{mb}^T W S_m]$ in equation (21), which needs to be inverted, is not symmetrical.

Figure 3:
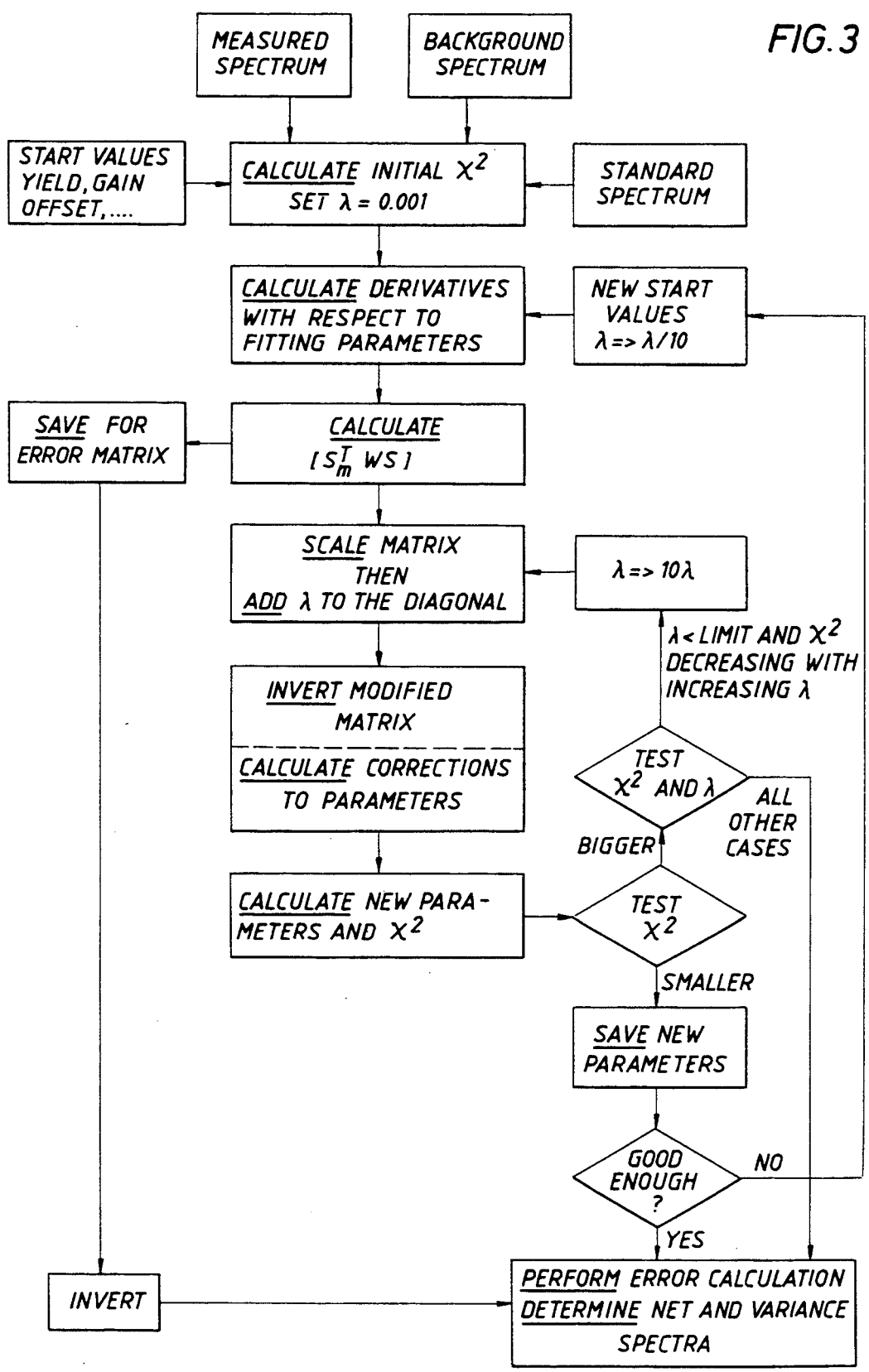
FIG. 3 is a flow diagram of one example of a non linear solving method used for determining the best fit.

Hereafter is depicted, by way of non limiting example, the way the system of equations (21) is solved by using a non linear solving method, such as e.g. the Marquardt's method, in order to determine the elemental yields associated with the spectra, the gain, offset and RDF corrections needed and the BSF. A flow diagram for the nonlinear solving method according to the invention is shown in FIG. 3.

Marquardt's method is a solving method, known per se, of the non-linear type, which uses first derivatives of $X^2$ with respect to the fitting parameters. The non-linear approach is based on the idea that the fitting function can be linearized locally:

$$\chi^2(\alpha) = \chi^2(\alpha_o) + \sum_{i=1}^n d\chi^2(\alpha_o)/d\alpha_i \delta \alpha_i \quad (22)$$

where $X^2_o$ is the value of $X^2$ at some starting point and $\delta \alpha_i$ are increments in the parameters $\alpha_i$ to reach the point at which the fitting function and $X^2$ are to be evaluated.

The method aims at finding the parameters ($\alpha$) which describe the minimum for $X^2$, where $X^2$ is:

$$\chi^2 = \sum_i \frac{\left( \sum_k y_k S_k^i(\alpha) + bB^i(\beta) - U^i \right)^2}{V^i(b)} \quad (23)$$

where "$V^i$" (variance of channel i) can be expressed as:

$$V^i = U^i + b^2 B^i = \frac{1}{W^i} \quad (24)$$

"$y_k$" is the yield of the i-th standard, $S_k^i$ the content of channel i of the k-th standard. Locally, in the neighborhood of the minimum, the non-linear problem can be reduced to a linear least squares fit. The variance "V" is increased by a term $b^2 B^i$ because the background spectrum is actually a statistical spectrum, as opposed to a "true" standard which is a assumed to be known precisely (i.e. being non statistical).

Marquardt's method represents a mixture between an analytical solution and a gradient search. In the analytical solution, the individual variables (parameters) are assumed to belong to orthogonal standards and they can therefore be minimized individually. In the gradient search, it is assumed that the fit takes place close to the global minimum. Marquardt's method uses a factor $\lambda$ emphasizing the diagonal term in the matrix $[S^T W S]$ called the local matrix. The matrix is also scaled in such a way as to make the diagonal terms 1 in the absence of $\lambda$. The matrix is not symmetric because of the fact that the variance V depends on b (BSF), as shown by equation 24. As the minimum is approached, "c" will go to zero and the local matrix $[S_m^T]$ will become almost symmetrical.

The method according to the invention for determining the best fit proceeds as follows (see FIG. 3):

The respective measured and background spectra, the composite spectra, the initial guess (starting values) for the fitting parameters, as well as a convergence criterion (e.g. $X^2$ does not improve from one iteration to the next) are entered. The initial $X^2$ is calculated and $\lambda$ is set to 0.001.

The derivatives of $X^2$ with respect to the elemental yields, gain, offset, RI)F and BSF are calculated (see equations 13, 14 and 15).

The local matrix $[S_m^T W\ S]$ is calculated and saved to determine the error matrix E (see equation 5) at the end of the calculation. It has to be noted that $S_m^T$ is not the exact transpose of S since some of its elements are modified to account for the fact that V is a function of b (see equations 18, 19 and 20). As the solution is reached $S_m^T$ approaches $S^T$.

The local matrix is scaled by dividing every element "$a_{kl}$" of the local matrix by the square root of the corresponding diagonal elements:

$$a_{kl} \rightarrow a_{kl} / \sqrt{(a_{kk}\ a_{ll})} \qquad (25)$$

Then λ is added to the diagonal elements.

The scaled local matrix is then inverted and the corrections to the initial guesses are calculated.

The new parameters are determined and the gain-offset corrections initially applied to the standards are now used to correct the measured spectrum to give it the same gain as the one of the unaltered standards. This is necessary to keep the normalization energy range constant (as already stated the components $U^i$ of each vector U are normalized such that the sum of $U^i$'s is unity). RDF still needs to he applied to the standards. $X^2$ is recalculated.

If $X^2$ has improved (i.e. became smaller) and the convergence criterion is met, the fit is terminated.

If $X^2$ has improved but the convergence criterion is not met, the fit is repeated with the new fitted values as the new guesses and with λ reduced by a factor 10. This reduction brings the search closer to an analytical solution.

If $X^2$ has increased, the fit is repeated with the old starting values for the parameters but with λ increased by a factor of 10. If, in the next iteration, $X^2$ keeps increasing, the fit is terminated. The fit is also terminated if λ exceeds a maximum value (e.g. $\lambda_{max} = 10^6$), or if the iteration count exceeds a given maximum value (e.g. $10 < ITER_{max} < 50$).

If the fit is terminated, the covariance matrix $(S^T W\ S)^{-1}$ is calculated (see equation 7) and the net (background subtracted) spectrum as well as its variance spectrum $V_{net}$ may he determined.

The outputs are:
the net spectra and their variance spectra;
the elemental yields and their statistical errors, for measured and background spectra;
gain, offset and RDF with statistical errors;
BSF and its associated errors; and
$X^2$ reduced to the minimum value. Turning back to FIG. 1, when the best fit is met, elemental yields determination device 64 is instructed, via communication line 76, to output its data to tape/plotter 68, or some other recording device. If the best fit is not obtained, a control signal is sent, via communication line 78, from spectrum comparator 60 to a spectrum adjustor 56 which carries out the steps hereabove described in connection with FIG. 3.

Once the relative yields $Y_k$ of gamma rays resulting from interactions (such as e.g. capture) of neutrons with the different constituents present in the formation have been determined, the proportion of the formation constituents may be determined in analyzer 70 (e.g. see 783' patent).

The sonde 10 may, in an alternative embodiment, comprise two gamma ray detectors, in order to determine the hydrocarbon saturations in the earth formation, as depicted in U.S. Pat. No. 4,937,448 to Roscoe, Stoller and McKeon already referred to. Using a two detector sonde, the above described process of determining the elemental yields is carried out for each detector. Information derived form both detectors may also be combined to derive the oil saturation $S_o$ in the formation and the oil saturation $C_b$ in the borehole, as described in the pending patent application filed on May 9, 1990, Ser. No. 07/521,804 in the name of B. Roscoe and C. Stoller, and which is commonly owned with the present application and which is herein incorporated by reference.

Although the invention has been described herein with reference to a specific embodiment, many modifications and variations therein will readily occur to those skilled in the art.

In particular, any non linear fitting method is suitable to implement the invention, such as e.g. Marquerat method, a grid search, or a gradient search. More details on these non linear methods, from the mathematical standpoint, can be found in the book "Data Reduction and Error Analysis for the Physical Sciences" from P. R. Bevington, editor MacGrew-Hill Book Company, 1969.

Moreover, the invention can be captioned, in general terms, as a method for matching a measured spectrum derived from the detection of nuclear particles representative of unknown earth formations surrounding a borehole, to a reference spectrum, wherein both measured and reference spectra are expressed in a numerical form, i.e. which cannot be expressed by a mathematical formula, including determining the best fit between the measured and reference spectra by means of a non linear fitting technique. The expression "numerical form" should be understood as "non analytical form". In other words, both measured and reference spectra to be matched are in a numerical form if the respective functions $z = f(x)$ representing these spectra, e.g. are given in tabular form for certain values of the independent variable "x", or are described by a given procedure or prescription.

Furthermore, as already stated, the invention is not limited to the logging industry and can be applied to any process where a spectral analysis of radiation involves a match between a measured spectrum and a composite spectrum.

In the logging industry, the invention can find application e.g. in natural gamma ray logging (see U.S. Pat. No. 3,976,878 to P. Chevalier & B. Seeman) or neutron induced gamma ray logging (see e.g. U.S. Pat. No. 4,484,569 to Flaum), or tracer logging (see U.S. Pat. No. 4,188,218 to W. E. Cubberly).

Outside of well logging technique, the invention can e.g. be applied in material analysis using x-rays wherein x-rays are produced either by x-ray fluorescence, electron, or proton excitation; spectra are acquired with solid state detectors Si(Li), Ge etc, scintillation detectors, proportional counters or other spectroscopy detectors. Another application may be material analysis using gamma-rays coming from natural radiation, or radioactive isotopes in the material to investigate, or from neutron activation, or from neutron scattering or capture, or gamma rays induced by high energy charged particle reactions; spectra are acquired with solid state detectors, scintillatore or other spectroscopy detectors. A further application is medical analysis for whole body scans or partial scans using radioactive tracers. As a final example, airport security systems could use the method according to the invention, by detecting neutron induced gamma rays.

What is claimed is:

1. A method for decomposing a gamma ray spectrum representative of an unknown material in order to determine the respective gamma ray contribution of each constituent postulated to constitute said material, comprising:

measuring gamma rays of said unknown material by detecting and counting the gamma rays issued from said material;

forming an energy spectrum of said measured gamma rays;

establishing a composite spectrum constructed of individual standard spectra of said postulated constituents and comprising elemental yields being representative of the fraction of the corresponding constituents in said composite spectrum;

determining the best fit between said measured spectrum and said composite spectrum by simultaneously varying at least two parameters from a set of parameters which describe the transformation of the measured and composite spectra from channel numbers to each spectrum's physical domain, said parameter set containing gain, offset, resolution, resolution degradation, background subtraction and non-linear gain parameters; and determining from the best fit and a best composite spectrum associated with said best fit the relative fractions of the gamma ray spectra associated with the corresponding constituents of said material or one or more of the parameters describing the spectral transformation from channel numbers to the physical domain.

2. The method according to claim 1 wherein said best fit is a non linear least squares search for a global minimum of $X^2 = (S\ Y - U)^T W(S\ Y - U)$, where "U" is a matrix representing said measured spectrum, "S" is a matrix representing said composite spectrum, "Y" is a matrix representative of said elemental yields and "W" is the weight matrix.

3. The method according to claim 2 wherein said search is a gradient search.

4. The apparatus according to claim 3 wherein said best fit is a non linear least squares search for a global minimum of $X^2 = (S\ Y - U)^T W(S\ Y - U)$, where "U" is a matrix representing said measured spectrum, "S" is a matrix representing said standard spectra, and "Y" is a matrix representative of said elemental yields and "W" is the weight matrix.

5. The apparatus according to claim 4 wherein said search is a gradient search.

6. The method according to claim 1 wherein said material includes earth formation surrounding a borehole.

7. The method according to claim 6 further comprising irradiating said formation with neutrons of sufficient energy to interact with the atoms of said material constituents and said detecting step comprises detecting said gamma rays resulting from the interactions between said neutrons and said constituents atoms.

8. The method according to claim 6 wherein said detecting step comprises detecting gamma rays issued from radioactive tracers incorporated in said formation.

9. The method according to claim 6 wherein said detecting step comprises detecting said gamma rays resulting from the natural radioactivity of said earth formation.

10. The method according to claim 1 wherein the step of determining the best fit comprises minimizing the chi-square function defined as:

$$\chi^2 = \sum_{i=1}^{m} (E^i)^2/V^i$$

where "m" is the number of elemental energy intervals; "$V^i$" is the variance of the content of each energy interval in said measured spectrum, with $V^i = 1/W^i$; and "$E^i$" is the error in the fit, with $$E^i = \sum_{k=1}^{n} S_k^i y_k - U^i \quad \text{for } i = 1, \ldots, m$$

where "n" is the number of said constituents; "S" is the matrix representative of said standard spectra; "$W^i$" is the weight of the content of each energy interval of the measured spectrum; "Y" is a vector whose components are the elemental yields; and "U" is the measured spectrum; said minimizing step comprising multiplying the derivative of $X^2$ with respect to at least one parameter and related to the background by a factor "K" representative of the fact that the background spectrum presents a statistical nature.

11. The method according to claim 10 wherein said factor $K = 1 - c$, where $$c = b\ W^i \left( \sum_k y_k S_k^i + bB^i - U^i \right)$$

where "b" is the background subtraction factor; "$y_k$" is the elemental yield; and "B" is the background spectrum.

12. The method according to claim 1 further including the step of deriving from said relative fractions of the gamma ray spectra which provide the best fit, the fraction of each of said constituents.

13. A method for decomposing a gamma ray spectrum representative of an unknown material in order to determine the respective gamma ray contribution of each constituent postulated to constitute said material, comprising;

measuring gamma rays of said unknown material by detecting and counting the gamma rays issued from said material;

forming an energy spectrum of said measured gamma rays;

establishing a composite spectrum constructed of individual standard spectra of said postulated constituents and comprising elemental yields being representative of the fraction of the corresponding constituents in said composite spectrum;

determining the best fit between said measured spectrum and said composite spectrum by simultaneously varying at least one elemental yield and at least one parameter from a set of parameters which describe the transformation of the measured and composite spectra from channel numbers to each spectrum's physical domain, said parameter set containing gain, offset, resolution, resolution degradation, background subtraction and non-linear gain; and determining from the best fit and a best composite spectrum associated with said best fit, the relative fractions of the gamma ray spectra associated with the corresponding constituents of said material or one or more of the parameters describing the spectral transformation from channel numbers to the physical domain.

14. The method according to claim 13 wherein said best fit is a non linear least squares search for a global minimum $X^2 = (S\ Y - U)^T W (S\ Y - U)$, where "U" is a matrix representing said measured spectrum, "S" is a matrix representing said composite spectrum, "Y" is a matrix representative of said elemental yields and "W" is the weight matrix.

15. The method according to claim 14 wherein said search is a gradient search.

16. The method according to claim 13, wherein said material includes earth formation surrounding a borehole.

17. The method according to claim 16 further comprising irradiating said formation with neutrons of sufficient energy to interact with the atoms of said material constituents and said detecting step comprises detecting said gamma rays resulting from the interactions between said neutrons and said constituents atoms.

18. The method according to claim 16 wherein said detecting step comprises detecting gamma rays issued from radioactive tracers incorporated in said formation.

19. The method according to claim 13 wherein the step of determining the best fit comprises minimizing the chi-square function defined as:

$$\chi^2 = \sum_{i=1}^{m} (E^i)^2 / V^i$$

where "m" is the number of elemental energy intervals; "$V^i$" is the variance of the content of each energy interval in said measured spectrum, with $V^i = 1/W^i$; and "$E^i$" is the error in the fit, with $$E^i = \sum_{k=1}^{n} S_k^i y_k - U^i \quad \text{for } i = 1, \ldots, m$$

where "n" is the number of said constituents; "S" is the matrix representative of said standard spectra; "$W^i$" is the weight of the measured spectrum; "Y" is a vector whose components are the elemental yields; and "U" is the measured spectrum; said minimizing step comprising multiplying the derivative of $X^2$ with respect to at least one parameter and related to the background by a factor "K" representative of the fact that the background spectrum presents a statistical nature.

20. The method according to claim 19 wherein said factor $K = 1 - c$, where $$c = b\ W^i \left( \sum_k y_k S_k^i + bB^i - U^i \right)$$

where "b" is the background subtraction factor "$y_k$" is the elemental yield; and "B" is the background spectrum.

21. The method according to claim 13 further including the step of deriving from said elemental yields which provide the best fit, the fraction of each of said constituents.

22. The method of claim 13 wherein said energy spectrum formation further comprises forming a background energy spectrum of said measured gamma rays and said best fit determination is between the measured, background and composite spectra.

23. An apparatus for decomposing a gamma ray spectrum representative of an unknown material in order to determine the respective gamma ray contribution of each constituent postulated to constitute said material, comprising;

means for measuring gamma rays of said unknown material by detecting and counting the gamma rays issued of said material;

means for forming an energy spectrum of said measured gamma rays;

means for establishing a composite spectrum constructed of elemental standard spectra of said postulated constituents and comprising elemental yields being representative of the fraction of the corresponding constituent in said composite spectrum;

means for determining the best fit between said measured spectrum and said composite spectrum by simultaneously varying at least two parameters from a set of parameters which describe the transformation of the measured and composite spectra from channel numbers to each spectrum's physical domain, said parameter set containing gain, offset, resolution, resolution degradation, background subtraction and non-linear gain parameters; and means for determining from the best fit and a best composite spectrum associated with said best fit, the relative fractions of the gamma ray spectra associated with the corresponding constituents of said material or one or more of the parameters describing the spectral transformation from channel numbers to the physical domain.

24. The apparatus according to claim 23 further comprising means for deriving from said relative fractions of the gamma ray spectra which provide the best fit, the fraction of each of said constituents.

25. The apparatus according to claim 23 wherein said best fit is a non linear least squares search for a global minimum of $X^2 = (S\ Y - U)^T W (S\ Y - U)$, where "U" is a matrix representing said measured spectrum, "S" is a matrix representing said standard spectra, "Y" is a matrix representative of said elemental yields and "W" is the weight matrix.

26. The apparatus according to claim 25 wherein said search is a gradient search.

27. The apparatus according to claim 23 wherein said unknown material comprises earth formation surrounding a borehole.

28. The apparatus according to claim 27 further comprising means for irradiating said formation with neutrons of sufficient energy to interact with the atoms of said formation constituents and said means for detecting are designed to detect the gamma rays resulting from the interactions between the neutrons and the constituents atoms.

29. The apparatus according to claim 24 wherein said detecting means are designed to detect the gamma rays resulting from the natural radioactivity of said earth formation.

30. The apparatus according to claim 23 wherein the step of determining the best fit further comprises a means for minimizing the chi-square function defined as:

$$\chi^2 = \sum_{i=1}^{m} (E^i)^2/V^i$$

where "m" is the number of elemental of energy intervals: "$V^i$" is the variance of the content of each of said energy interval in the measured spectrum, with $V^i = 1 - /W^i$; and "$E^i$" is the error in the fit, with:

$$E^i = \sum_{k=1}^{n} S_k^i Y_k - U^i \quad \text{for } i = 1, \ldots, m$$

where "n" is the number of said constituents; "S" is the matrix representative of said standard spectra; "U" represents said measured spectrum; "Y" represents said elemental yields; and "W" represents the weight matrix; said minimizing means comprising means for multiplying the derivative of $X^2$ with respect to at least one parameter related to the background, by a factor "K" representative of the fact the background spectrum presents a statistical nature.

31. The method of claim 23 wherein said means for forming an energy spectrum further comprises a means for forming a background energy spectrum of said measured gamma rays and said means for determining best fit is between the measured, background and composite spectra.

32. An apparatus for decomposing a gamma ray spectrum representative of an unknown material in order to determine the respective gamma ray contribution of each constituent postulated to constitute said material, comprising:
   means for measuring gamma rays of said unknown material by detecting and counting the gamma rays issued of said material;
   means for forming an energy spectrum of said measured gamma rays;
   means for establishing a composite spectrum constructed of elemental standard spectra of said postulated constituents and comprising elemental yields being representative of the fraction of the corresponding constituent in said composite spectrum;
   means for determining the best fit between said measured spectrum and said composite spectrum by simultaneously varying at least one elemental yield and at least one parameter from a set of parameters which describe the transformation of the measured and composite spectra from channel numbers to each spectrum's physical domain, said parameter set containing gain, offset, resolution, resolution degradation, background subtraction and non-linear gain parameters; and
   determining from the best fit and a best composite spectrum associated with said best fit, the relative fractions of the gamma ray spectra associated with the corresponding constituents of said material or one or more of the parameters describing the spectral transformation from channel numbers to the physical domain.

33. The apparatus according to claim 32, further comprising means for deriving from elemental yields which provide the best fit, the fraction of each of said constituents.

34. The apparatus according to claim 32 wherein said unknown material comprises earth formation surrounding a borehole.

35. The apparatus according to claim 34 further comprising means for irradiating said formation with neutrons of sufficient energy to interact with the atoms of said formation constituents and said means for detecting are designed to detect the gamma rays resulting from the interactions between the neutrons and the constituents atoms.

36. The apparatus according to claim 34 wherein said detecting means are designed to detect the gamma rays resulting from the natural radioactivity of said earth formation.

37. The apparatus according to claim 32 wherein the means for determining the best fit further comprising a means for minimizing the chi-square function defined as:

$$\chi^2 = \sum_{i=1}^{m} (E^i)^2/V^i$$

where "m" is the number of elemental of energy intervals; "$V^i$" is the variance of the content of each of said energy interval in the measured spectrum, with $V^i = 1 - /W^i$; and "$E^i$" is the error in the fit, with:

$$E^i = \sum_{k=1}^{n} S_k^i Y_k - U^i \quad \text{for } i = 1, \ldots, m$$

where "n" is the number of said constituents; "S" is the matrix representative of said standard spectra "U" represents said measured spectrum; "Y" represents said elemental yields; "W" represents the weight matrix; said minimizing means comprising means for multiplying the derivative of $X^2$ with respect to a least one parameter related to the background, by a factor "K" representative of the fact the background spectrum presents a statistical nature.

38. The method of claim 32 wherein said energy spectrum formation further comprises forming a background energy spectrum of said measured gamma rays and said best fit determination is between the measured, background and composite spectra.

39. A method for decomposing a gamma ray spectrum representative of an unknown material in order to determine the respective gamma ray contribution of each constituent postulate to constitute said material, comprising:
   measuring gamma rays of said unknown material by detecting and counting the gamma rays issued from said material;
   forming an energy spectrum and a background energy spectrum of said measured gamma rays;
   establishing a composite spectrum constructed of individual standard spectra of said postulated constituents and comprising elemental yields being representative of the fraction of the corresponding constituents in said composite spectrum;
   determining the best fit between said measured spectrum, said background specrum and said composite spectrum by simultaneously varying at least two parameters from a set of parameters which describe the transformation of the measured, background and composite spectra from channel numbers to each spectrum's physical domain, said parameter set containing gain, offset, resolution, resolution degradation, BSF, element yields and non-linear gain parameters; and determining from the best fit and an associated best composite spectrum the relative fractions of the gamma ray spectra associated with the corresponding elemental constituents of said material or one or more of the parameters describing the spectral transformation from channel numbers to the physical domain.

40. The method of claim 39 wherein in the best fit determination step at least one elemental yield is varied and at least one other paramater is simultaneously varied.

41. The method of claim 39 further including the step of deriving from said relative fractions of the gamma ray spectra which provide the best fit, the fraction of each of said constiuents.

* * * * *